US008042065B2

(12) United States Patent
Wong et al.

(10) Patent No.: US 8,042,065 B2
(45) Date of Patent: Oct. 18, 2011

(54) SMART COPY/PASTE OF GRAPHICAL NODES

(75) Inventors: Karen K. Wong, Redmond, WA (US); Andrew J. Howe, Sammamish, WA (US); Brent Gilbert, Woodinville, WA (US); Crystal L. Hoyer, Redmond, WA (US); Matthew J. Kotler, Kenmore, WA (US); Mikko T. Mannisto, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 379 days.

(21) Appl. No.: 11/281,076

(22) Filed: Nov. 17, 2005

(65) Prior Publication Data

US 2007/0112832 A1    May 17, 2007

(51) Int. Cl.
G06F 3/048    (2006.01)
G06F 7/00    (2006.01)
(52) U.S. Cl. .................. 715/853; 715/770; 707/805
(58) Field of Classification Search .................. 707/102, 707/805, 809; 715/853–855, 762–763, 769–770, 715/825; 717/113
See application file for complete search history.

(56) References Cited

U.S. PATENT DOCUMENTS

| 5,010,500 A | 4/1991 | Makkuni et al. |
| 5,020,411 A | 6/1991 | Rowan et al. |
| 5,050,088 A | 9/1991 | Buckler et al. |
| 5,905,498 A * | 5/1999 | Diament ........................ 715/853 |
| 2004/0197727 A1 | 10/2004 | Sachdeva et al. |
| 2005/0289526 A1* | 12/2005 | Wang et al. .................... 717/144 |

OTHER PUBLICATIONS

Walker et al., "Microsoft Office Visio 2003 Inside Out", Published Oct. 29, 2003 by Microsoft Press, copyright 2004 by Mark H. Walker and Resources Online, as presented by Safari Books Online, http://proquest.safaribooksonline.com/073515160.*
Citrin et al., "Style-Based Cut-and-Paste in Graphical Editors", copyright 1994 Association of Computing Machinery (ACM).*
Critin et al., "Style-based Cut-and-Paste in Graphical Editors", Feb. 1994, Technical Report CU-CS-706-94, University of Colorado at Boulder.*
International Search Report dated Apr. 11, 2007 for Application No. PCT/US2006/044169,10 pages.

* cited by examiner

*Primary Examiner* — William L Bashore
*Assistant Examiner* — Andrew Tank (57) ABSTRACT

When using graphical diagrams, cutting and pasting operations may take advantage of predefined relationships to intelligently insert and remove items from the diagram. A text data model may be interpreted sequentially or hierarchically to construct various diagrams. Pasting operations will bring new data into the diagram and data model while conforming the new data to the diagram definition. Cutting operations may cause the data model and diagram to be healed to conform to the diagram definition.

16 Claims, 8 Drawing Sheets

SMART COPY/PASTE OF GRAPHICAL NODES

BACKGROUND a. Technical Field

The present invention pertains generally to cutting and pasting of objects in a computer system and specifically to cutting and pasting of objects with predefined graphical diagrams.

b. Description of the Background

Graphical representation of objects and ideas is often required in computer systems. Many software applications are able to represent data in a myriad of different forms, and many of those software applications allow a user to create graphical representations such as graphs, diagrams, and other visual representations. In some cases, relationally defined diagrams may be used for displaying data. Relationally defined diagrams may include definitions of objects and relationships within the diagram that enables a computer application to construct the graphical representation.

Problems may arise when items from one application are copied and pasted into a pre-defined relational diagram. An object taken from one application or diagram may not be appropriate for the diagram into which it is being placed. Further, problems may arise when cutting an object from a diagram affects relationships established between other objects.

SUMMARY

When using graphical diagrams, cutting and pasting operations may take advantage of predefined relationships to intelligently insert and remove items from the diagram. A data model may be interpreted sequentially or hierarchically to construct various diagrams. Pasting operations will bring new data into the diagram and data model while conforming the new data to the diagram definition. Cutting operations may cause the data model and diagram to be healed to conform to the diagram definition.

DETAILED DESCRIPTION

While the invention is susceptible to various modifications and alternative forms, specific embodiments of the invention are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. In general, the embodiments were selected to highlight specific inventive aspects or features of the invention.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The invention may be embodied as devices, systems, methods, and/or computer program products. Accordingly, some or all of the invention may be embodied in hardware and/or in software (including firmware, resident software, micro-code, state machines, gate arrays, etc.) Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the invention is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
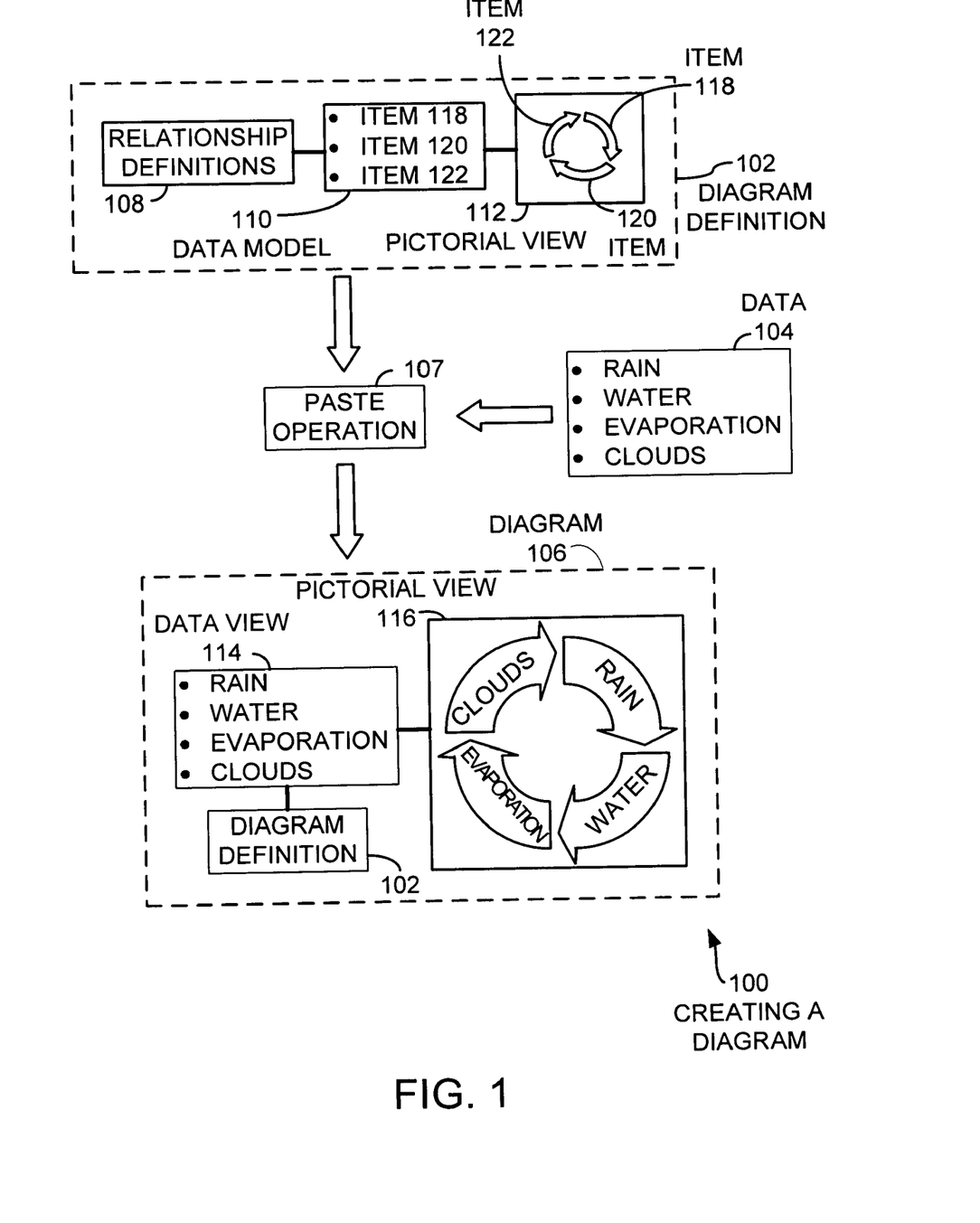
FIG. 1 is a diagrammatic illustration of an embodiment showing the creation of a sequential diagram.

FIG. 1 is a pictorial representation of an embodiment 100 showing the construction of a diagram. A diagram definition 102 is combined with data 104 to create a diagram 106 using a paste operation 107.

The diagram definition 102 comprises a set of relationship definitions 108, a data model 110, and a pictorial view 112. The data model 110 and pictorial view 112 both comprise several objects.

When combined with the data 104, the diagram definition 102 may be used to create a diagram 106. The diagram 106 comprises a data view 114, a pictorial view 116, and the diagram definition 102.

The embodiment 100 illustrates a mechanism for creating diagrams using a predefined diagram definition 102. Within the diagram definition 102, a set of relationship definitions 108 are used to construct a data model 110 and further to describe a pictorial view 112. Various objects may be placed in the data model 110, and the same objects may also be represented in the pictorial view 112.

The data model 110 may have rules in the relationship definitions 108 that describe the acceptable relationships between items or objects in the model. In some data models, the relationships between items may be a peer relationship, and such items may sometimes be treated as a sequential relationship. In other data models, the relationships between items may be a hierarchical relationship, and child items may be indented or otherwise displayed differently than the parent items.

The pictorial view 112 may likewise have rules in the relationship definitions 108 that define the layout, positioning, and other pictorial relationships between the various items. The pictorial view 112 defines the items 118, 120, and 122 in a series of arrows arranged in a circle. The relationship between the items is sequential, such that item 120 follows item 118, and item 122 follows item 120.

The paste operation 107 adds the data 104 into the data model 110 to create the diagram 106. The data 104 has four items, "rain", "water", "evaporation", and "clouds". The data model 110 in this case handles the data items as peers or as sequential, the data view 114 shows all four items at an equal hierarchical level. The relationship definitions 108 may create relationships between each data item. In the present example, the relationships may be sequential.

The pictorial view 116 shows all four items displayed on a diagram per the diagram definition 102. Each item is shown in sequence in a set of arrows arranged in a circle. The pictorial view 116 may be defined using rules that allow for many different numbers of items. For example, if another item were added to the data, the pictorial view 116 may then include five arrows arranged in a circle. In some cases, the pictorial view may be created to be independent of the number of data items, while in other cases, the pictorial view may require a specific number or a maximum and/or minimum number of items.

In a graphical user interface (GUI), the pictorial view 116 and/or the data view 114 may be displayed. In some embodiments, a user may be permitted to manipulate the graphical elements of the pictorial view 116, and further may be able to edit, add, and remove items directly in the pictorial view. Some embodiments may enable a user to edit, add, and remove items from the data view 114. In some embodiments, a user may be able to have both the data view 114 and pictorial view 116 shown on the GUI at the same time.

When items are added or removed from the data view 114 or pictorial view 116, the relationships between the remaining items after a change must be reestablished. For example, if an item "ocean" were added after the existing item "water", the sequential relationship between "water" and "evaporation" would be dissolved, and new sequential relationships would be established between "water" and the newly added "ocean" as well as between "ocean" and "evaporation".

In many embodiments, the diagram definition 102 may include default settings for various display characteristics for the items in the pictorial view 112. Such default settings may include characteristics about the shape, border, fonts, color, shading, or other settings that may affect the appearance. Additionally, the default settings may include a spatial orientation of the items. In some embodiments, a user may be able to change, alter, or manipulate one or more of such settings.

After the paste operation 107, the diagram definition 102 is contained within the diagram 106. As changes are made to the diagram 106, the diagram definition 102 may be referenced to coordinate changes to the diagram 106. In some cases, changes to the diagram 106 may include overriding a default or other setting of the diagram definition 102. In other cases, changes to the diagram 106 may include reapplying the rules and relationships contained with the diagram definition 102 to the diagram 106. Although not a comprehensive list of operations, several examples of such actions are illustrated in the following embodiments.

Figure 2:
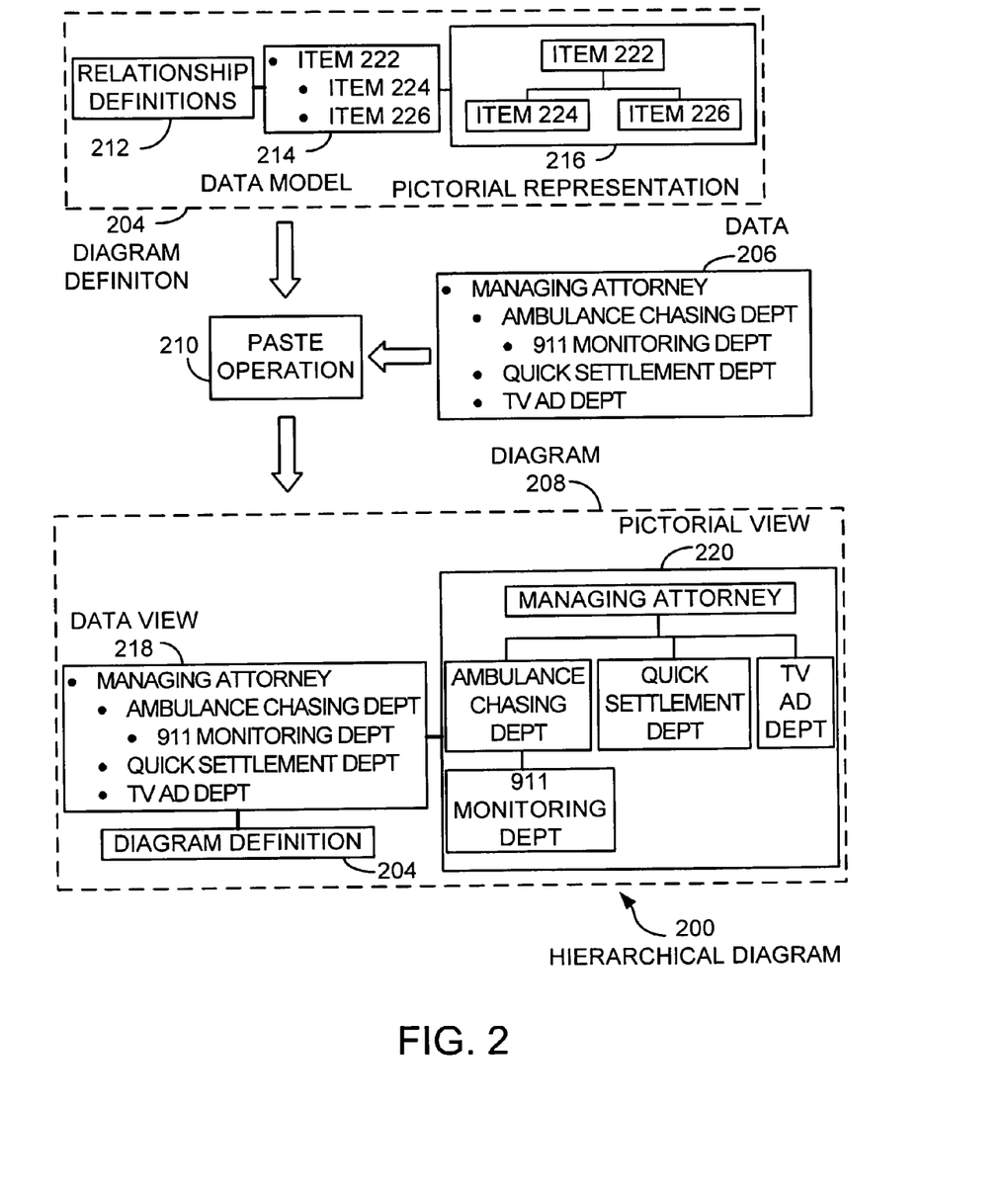
FIG. 2 is a diagrammatic illustration of an embodiment showing the creation of a hierarchical diagram.

FIG. 2 is a pictorial representation of an embodiment 200 of a construction of a hierarchical diagram. The diagram definition 204 may be combined with data 206 to create a diagram 208 using a paste operation 210.

The diagram definition 204 may include some relationship definitions 212, a data model 214, and a pictorial representation 216. The data model 214 depicts a hierarchical data model, where item 222 is at the highest level of the data model 214, and items 224 and 226 are children of item 222. When illustrated in the pictorial representation 216, the item 222 is at the top of an organizational chart, with items 224 and 226 on a secondary level from item 222.

The diagram 208 that results form the paste operation 210 contains a data view 218 and a pictorial view 220. The diagram 208 also includes the diagram definition 204.

In the data 206, data is presented in a hierarchical or indented format that is three layers deep. "911 Monitoring Dept" is a child of "Ambulance Chasing Dept", which is a child of "Managing Attorney". The relationship definitions 212 of the diagram definition 204 may include provisions for handling many layers of hierarchical relationships.

Embodiment 200 is an example of a hierarchical data model. A hierarchical data model may include several data items that have a peer or sequential relationship. For example, the items "Ambulance Chasing Dept", "Quick Settlement Dept", and "TV Ad Dept" are all peers of each other. In some diagrams, such items may be displayed in a sequential manner, such as with arrows between successive items. In some embodiments, hierarchical data may be used in a purely sequential diagram. In such a case, some data may be constructed in an indented outline form, but separate pictorial items may be allocated only for the highest level items. Where text is displayed in the pictorial view of the item, several indented layers of items may be displayed within a single pictorial item.

Many types of diagrams may be constructed using relationships defined between items in a data model. Hierarchical or sequential relationships may be established in addition to more complex relationships. Complex relationships may include rules for sorting or other manipulation of data, and may depend on the type of diagram envisioned.

The data 206 is presented in textual form. In many embodiments, plain text data may be applied to a diagram definition to create a new diagram. In some embodiments, the data may contain additional elements, such as font, style, color, shading, or other visual enhancement information. Further, some embodiments may use data other than text, such as numerical, image, or shape data. Various diagram definitions may handle additional or other data differently. In some cases, additional or other data may be discarded entirely or otherwise ignored. In other cases, a subset of the additional or other data may be included, while in still other cases, all of the additional or other data may be used to construct the diagram. In some embodiments, the raw data may not include any text data at all and may consist of graphical elements, numerical data, color types, or other types of data.

Figure 3:
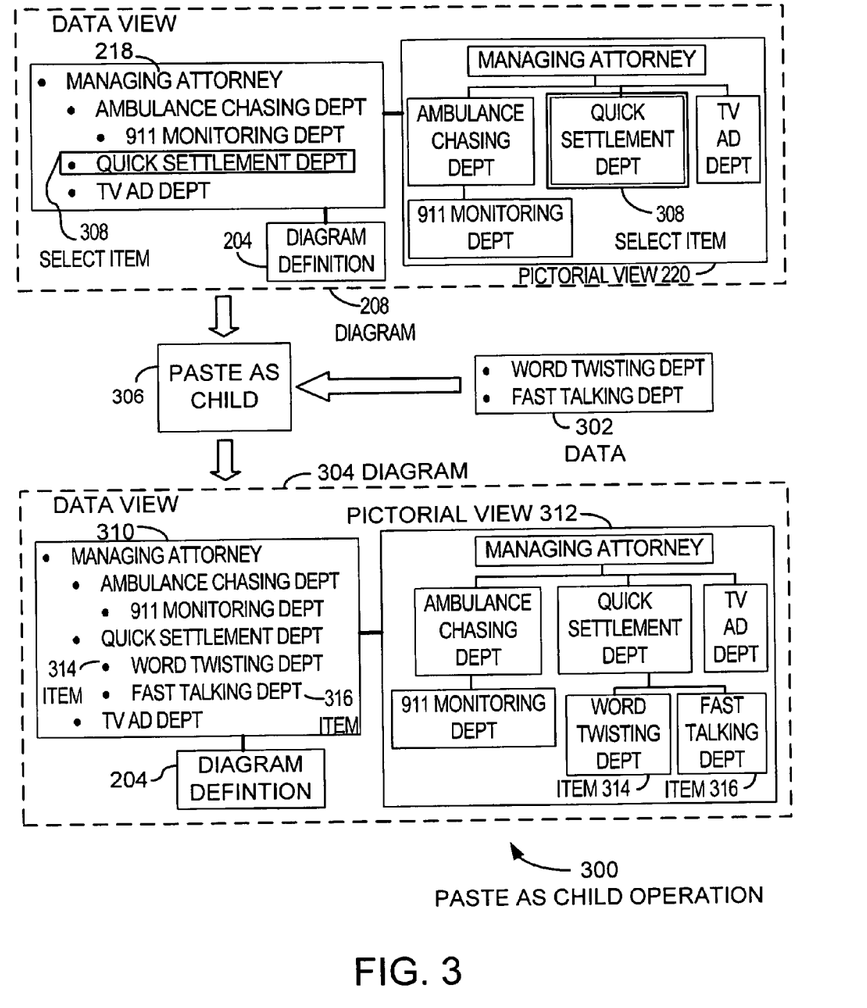
FIG. 3 is a diagrammatic illustration of an embodiment showing a paste as child operation.

FIG. 3 is a pictorial representation of an embodiment 300 of a paste as child operation. The data 302 is added to the diagram 208 to produce the diagram 304 using the paste-as-child operation 306. In the diagram 208, the item 308 is selected, "Quick Settlement Dept". The data 302 contains two items, "Word Twisting Dept" and "Fast Talking Dept", which are added as children. In the diagram 304, the items 314 and 316 correspond to the data 302 items "Word Twisting Dept" and "Fast Talking Dept", respectively.

The diagram 304 contains an updated data view 310, containing the items 314 and 316, as well as an updated pictorial view 312 with items 314 and 316. The organizational chart of pictorial view 312 shows the two new items 314 and 316 as below the "Quick Settlement Dept".

The embodiment 300 is one illustration of a method for adding or pasting items into a hierarchical diagram. A user may select the item 308 from either the data view 218 or pictorial view 220, and paste the data 302 beneath the item 308. The user may change the resultant diagram 304 by editing either the pictorial view 310 or data view 312. Because the pictorial view 312 and data view 310 can be representations of the same underlying data, the user may manipulate the data using editing tools for either representation.

When the new data 302 are added to the data used in the diagram 304, relationships between the existing data and new data are formed. Because the new data 302 were added as children of item 308, child relationships were formed between item 308 and each item in data 302. A peer or sequential relationship between "Quick Settle Dept" and "TV Ad Dept" already existed, and was kept in tact even after adding the data 302 as children to item 308.

Figure 4:
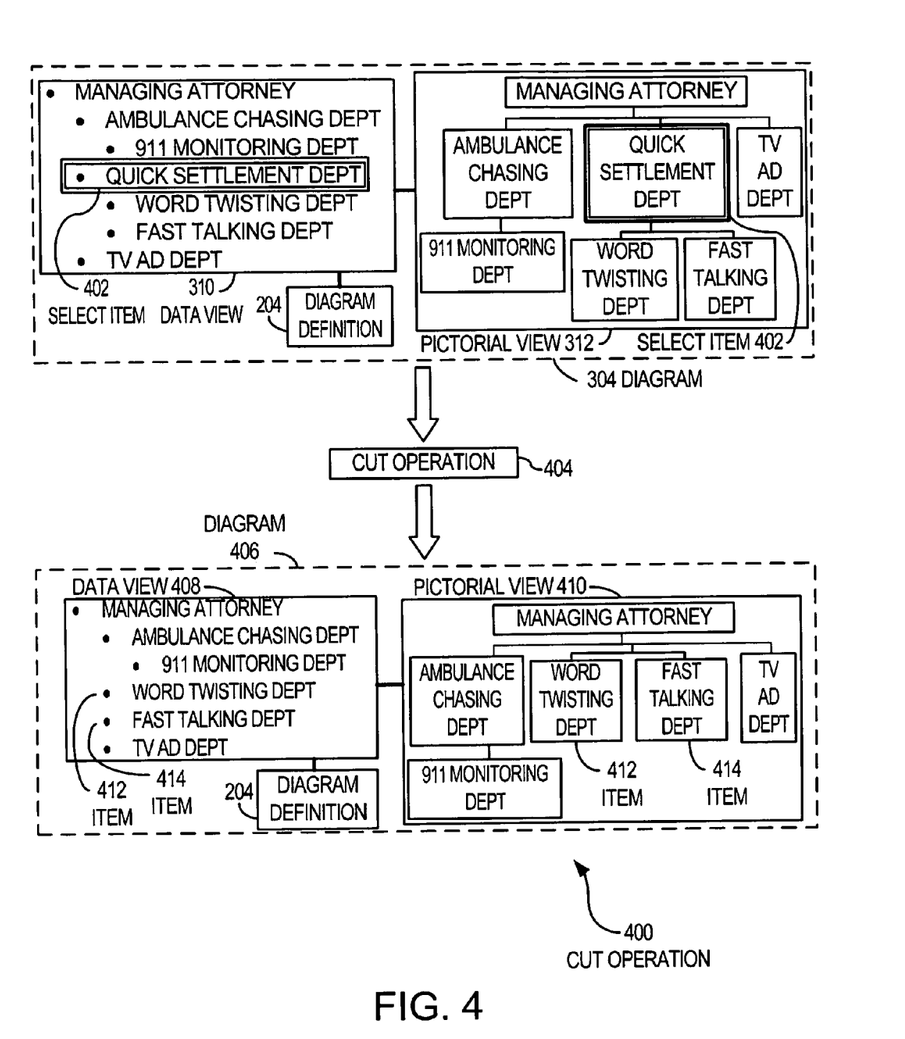
FIG. 4 is a diagrammatic illustration of an embodiment showing a cut operation.

FIG. 4 is a pictorial illustration of an embodiment 400 of a cut operation. The item 402, or "Quick Settlement Dept" was selected by a user in either the data view 310 or pictorial view 312 of diagram 304. After the cut operation 404, diagram 406 is created. Diagram 406 contains a data view 408, a pictorial view 410, as well as the diagram definition 204. In embodiment 400, the item 402 was removed from diagram 304. Item 402 had relationships to items 412 and 414 which were severed during the cut operation. In diagram 406, the severed relationships of items 412 and 414 were healed or reestablished with the other items, consistent with the diagram definition 204.

The diagram definition 204 may contain rules, logic, or other definitions that do not allow child items to exist without a parent item. If the item 402, "Quick Settlement Dept" was removed, the items 412 and 414, "Word Twisting Dept" and "Fast Talking Dept" would be parent-less children. After the item 402 was removed, the logic of the diagram definition 204 was applied and the items 412 and 414 were promoted to the next higher level of the hierarchy. Such promotion kept the data model consistent with the logic.

Different diagram definitions may incorporate different sets of logic that define the diagram. Some diagram definitions may allow child items to be unattached to a parent item on the immediately higher level, while other diagram definitions may not. In some diagram definitions, the sequence of the items may be significant and rules may be enforced to ensure compliance, for example. Each diagram definition may or may not have rules or logic that define certain minimum criteria for the relationships between data items. Whatever the rules or logic are for a particular diagram, the rules or logic may be enforced at changes to the data structure.

Figure 5:
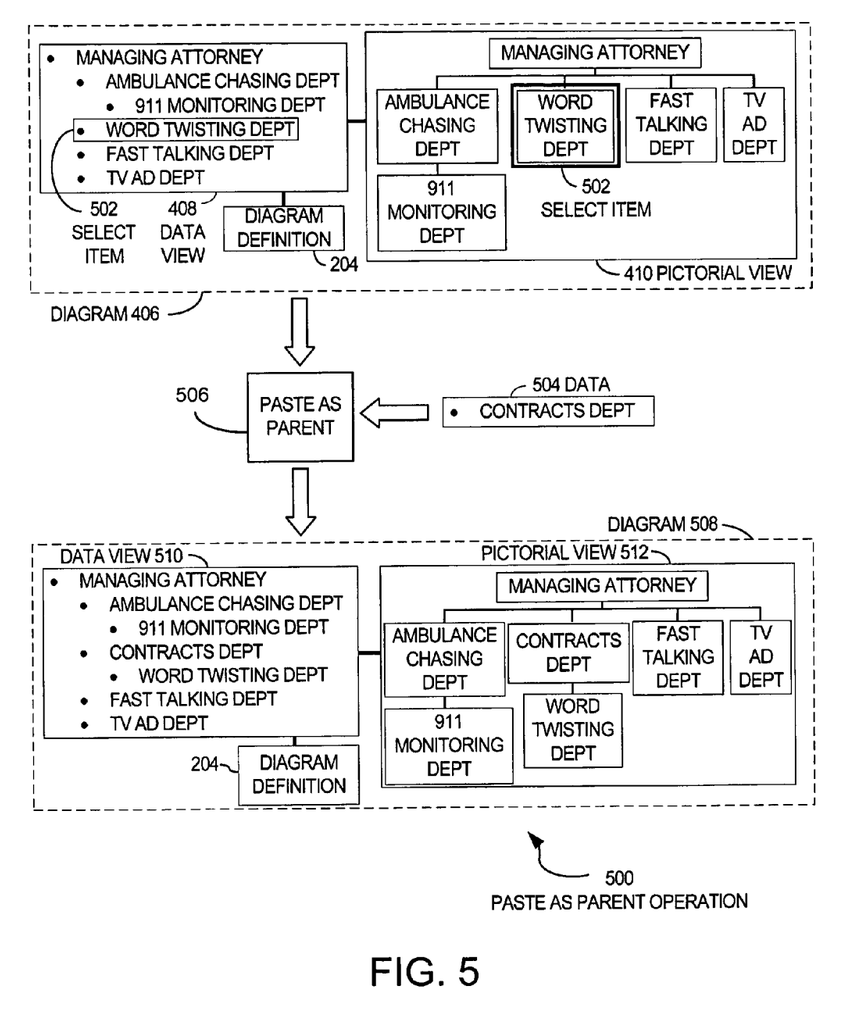
FIG. 5 is a diagrammatic illustration of an embodiment showing a paste as parent operation.

FIG. 5 is a pictorial illustration of an embodiment 500 of a paste-as-parent operation. The item 502, or "Word Twisting Dept" was selected by a user in either the data view 408 or pictorial view 410 of diagram 406. The data 504 "Contracts Dept" was added to the diagram 406 through the paste as parent operation 506 to create the diagram 508. Diagram 508 contains a data view 510, a pictorial view 512, and the diagram definition 204.

Embodiment 500 illustrates another operation that changes the relationships between the various items in a diagram. The data 504 "Contracts Dept" was added as a parent to item 502, "Word Twisting Dept". A new set of relationships was established for "Word Twisting Dept", which included being a child of the newly added "Contracts Dept". The previous parent/child relationship between "Managing Attorney" and "Word Twisting Dept" were severed. The relationships for "Contracts Dept" included being a child of "Managing Attorney", a parent to "Word Twisting Dept", and peers of "Ambulance Chasing Dept", "Fast Talking Dept" and "TV Ad Dept".

Figure 6:
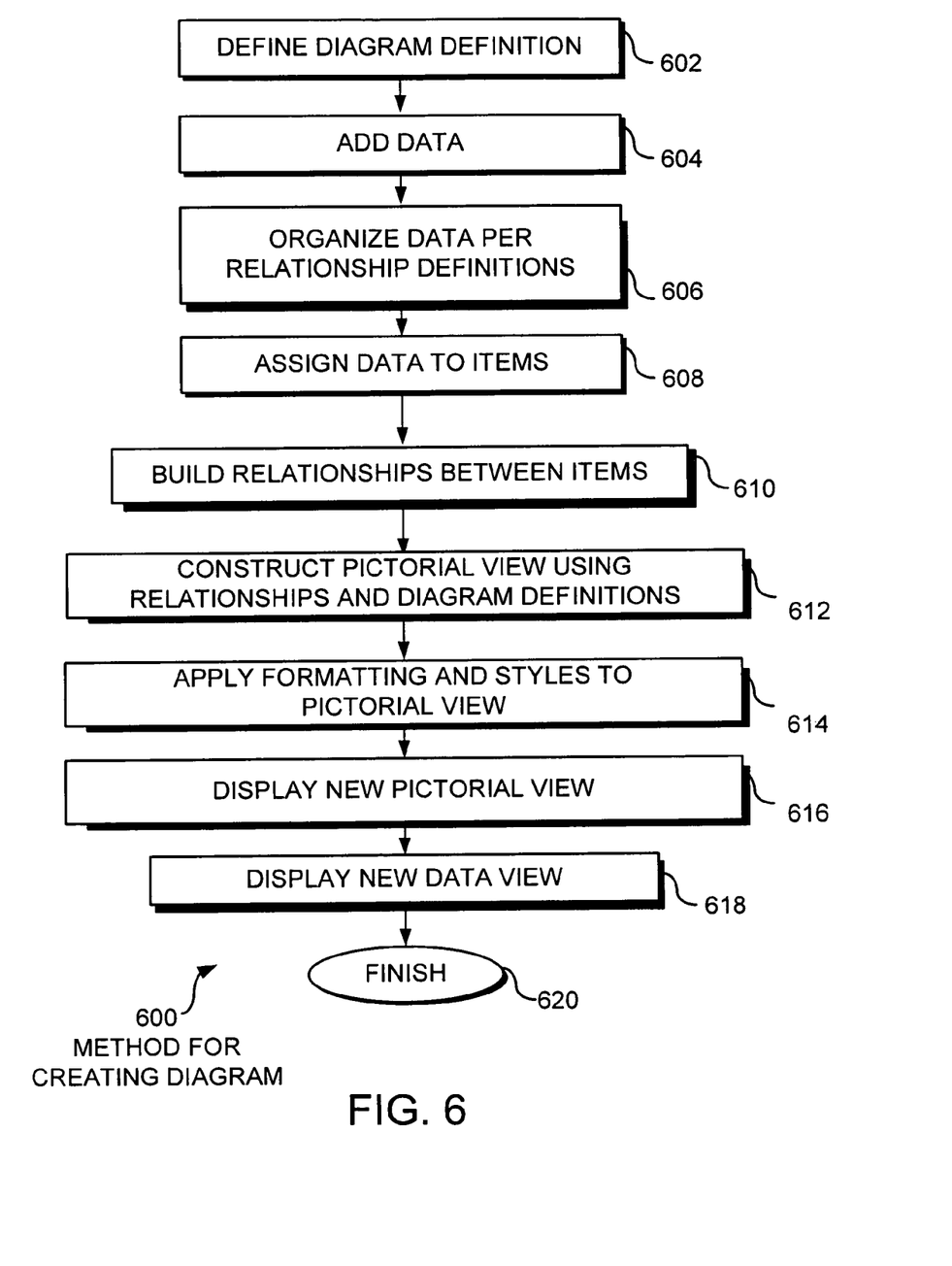
FIG. 6 is a flowchart illustration of an embodiment showing a method for creating a diagram.

FIG. 6 is a flowchart illustration of an embodiment 600 of a method for creating a diagram. The diagram definition is defined in block 602. Data is added to the diagram definition in block 604. The incoming data is organized per the relationship definitions of the diagram definition in block 606, and the data are assigned to items in block 608. Relationships between the items are established in block 610.

The pictorial view is constructed using the relationships and diagram definition in block 612, after which formatting and styles may be applied to the pictorial view in block 614. The new pictorial view is displayed in block 616 and the new data view is displayed in block 618. The process finishes in block 620.

The embodiment 600 illustrates a method by which a predefined diagram definition may be used to create a diagram. Incoming data may be first checked and organized to be consistent with the data model of the diagram definition. Relationships between the items may be established so that changes, additions, and deletions of items in the diagram may be readily incorporated into the pictorial view of the diagram. The relationships may help keep the pictorial view of the diagram to be consistent and intuitive to the user when changes are made.

The relationships described in this specification may be express relationships that may be individually assigned to each item, or the relationships may be implied in a larger definition or organization of the data. For example, when the data are presented in a list format, such as a series of text items separated by a delimiter such as a carriage return, an implied sequential and peer relationship may exist. Within such a data model, the implied relationships may be sufficient for the diagram definitions to properly function. In another embodiment, the individual text items may be separated into discrete objects or items, each with an expressly defined relationship between that item and another item. Various implementations or embodiments may handle the data definitions and relationship definitions in different manners. Some embodiments may be more simply defined yet require less processing or data storage overhead. Other embodiments may be defined in a more complex but more powerful manner, enabling more complex control over the items.

Figure 7:
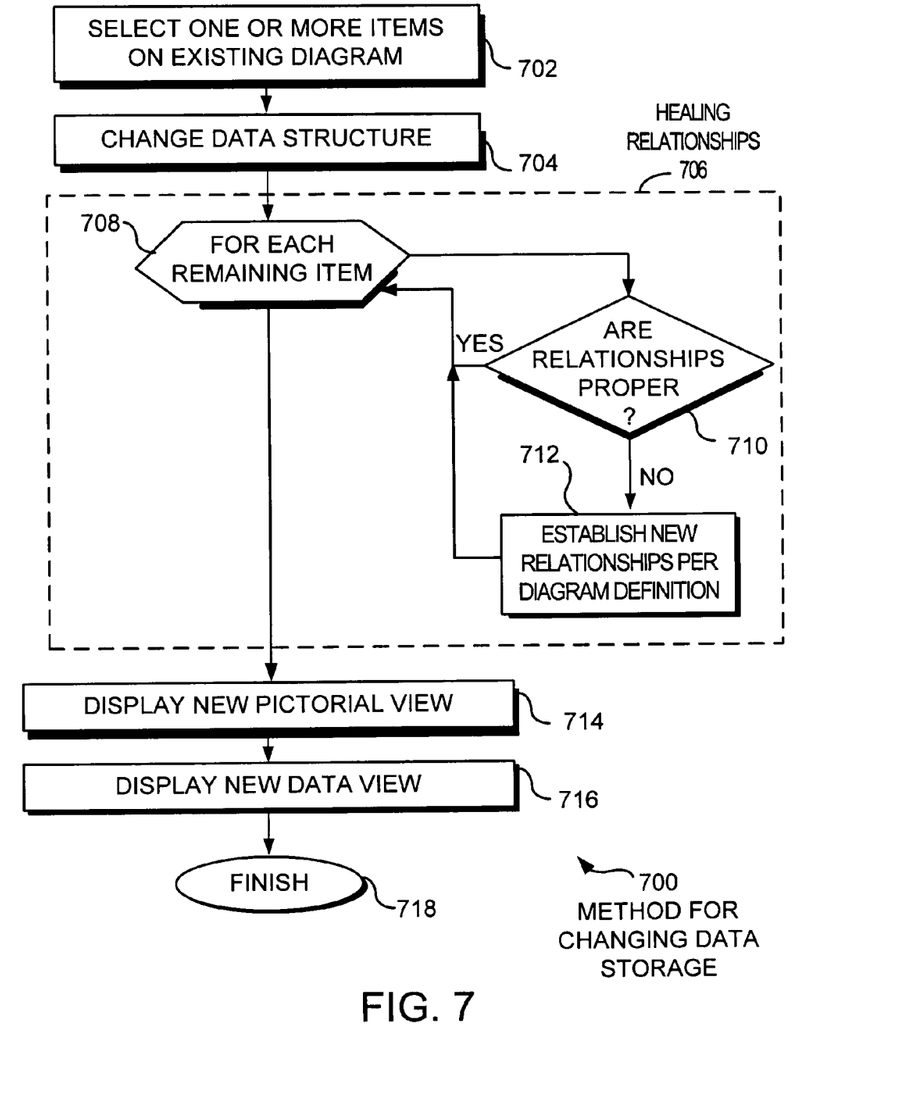
FIG. 7 is a flowchart illustration of an embodiment showing a method for modifying a diagram.

FIG. 7 is a flowchart illustration of an embodiment 700 showing a method for changing the data structure of a diagram. In an existing diagram, one or more items are selected in block 702. The data structure is changed in block 704. The relationships of the items in the data structure are healed in the procedure 706. The healing process comprises for each item in block 708, the relationships of that item are evaluated in block 710. If the relationships are not proper in block 710, new relationships are established per the diagram definition in block 712. After all the relationships are healed, a new pictorial view is generated and displayed in block 714, and a new data view is generated and displayed in block 716. The process ends in block 718.

The embodiment 700 may be used for any modification of the data in a diagram. For example, an item may be selected in block 702 and cut in block 704. In another example, an item may be selected in block 702 and replaced by a different item in block 704. In yet another example, an item may be selected in block 702 and additional data may be added in block 704.

After the data structure is modified, the relationships may be healed in the method 706. Relationships may be expressly defined for each item, or may implicit in the structure of the data. In either case, the items are individually scanned to ensure that they comply with the diagram definition. Each diagram definition may contain its own particular rules or definitions for acceptable data structures.

The relationships and data structures, once checked by the process 706, may be used to create a new pictorial view in block 714. The data relationships, such as sequential or hierarchical, may be used by the pictorial definition to create, organize, and layout a pictorial view.

Figure 8:
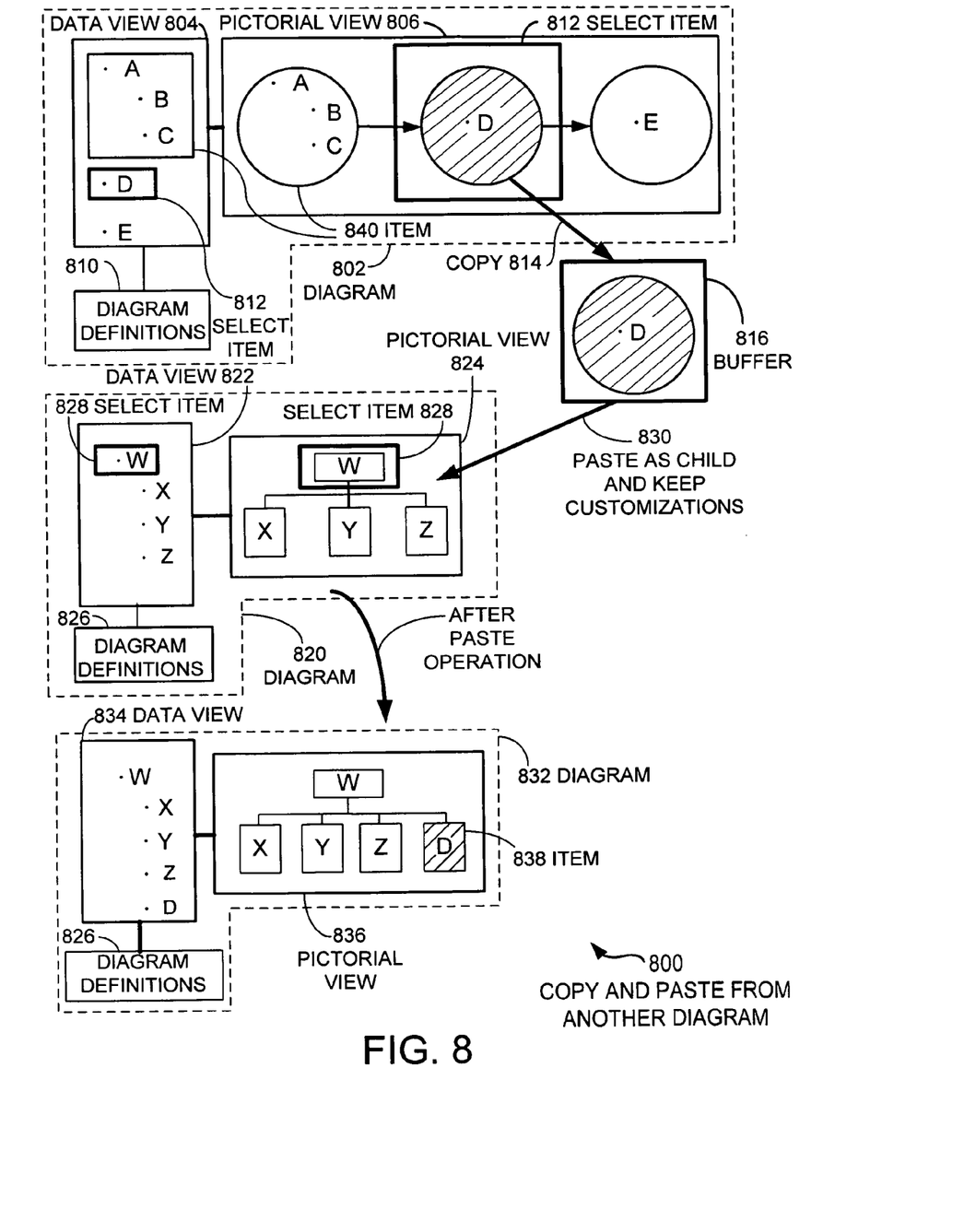
FIG. 8 is a diagrammatic illustration of an embodiment showing a copy and paste operation from one diagram to another.

FIG. 8 is a pictorial illustration of a copy and paste operation from one diagram to another diagram. A first diagram 802 contains a data view 804, a pictorial view 806, and diagram definitions 810. An item 812 may be selected from either the data view 804 or pictorial view 806 and copied 814 into a buffer 816.

A second diagram 820 may contain a data view 822, a pictorial view 824, and diagram definitions 826. An item 828 may be selected in either the data view 822 or pictorial view 824, and a paste as child operation 830 may be performed. The paste operation 830 may include an option to keep any customization parameters.

Diagram 832 may result from the paste operation. A modified data view 834 and pictorial view 836 incorporate the changes from the paste operation, and the diagram 832 keeps the same diagram definitions 826.

The item 812 in diagram 802 may be have some customization parameter settings, such as being shaded. Such settings may be caused by the user selecting the item 812 and modifying some default settings that change the appearance of the item 812. When the item is copied into the buffer 816, which may be a clipboard or other such tool, the entire definition of the item may be copied. For example, the shape of the item 812, as well as the customized shading, are copied.

When the item 812 is pasted into the diagram 820, some of the parameters that define the item are kept, while others are discarded. For example, the original shape of item 812, which is round, is discarded and the new item 838 is created in a rectangular shape. However, the customized shaded setting of item 812 is applied to the item 838, which is similarly shaded.

The diagram definition 826 may define the type of parameters that may be imported into the diagram 820, such as the customized shading, and the type of parameters that cannot be imported, such as the shape. In some cases, a customized parameter from another diagram may be imported, but a non-customized parameter may not. For example, the item 812 may have a default text style applied to the entire diagram 802. When the item 812 is imported into the diagram 820, the default text style of diagram 820 may be applied. However, if the text style of 812 is altered from the default setting, the customized style may override the default settings of the destination diagram 820. Any parameter that can be applied to the item 812 may be optionally imported into diagram 820.

In some cases, a user may have an option for which parameters from the source diagram 820 and item 812 will be applied to a newly created item that results from a paste or other import operation into a destination diagram 820. For example, the user may be presented with a dialogue box or have other settable options that enable the user to select specific parameters to import.

In other cases, a diagram definition 826 of the destination diagram 820 may have a filter or other type of rules that define how a new item will be created when imported from another diagram 802. The rules may specify that some parameters will not be imported, some parameters will optionally be imported, and/or some parameters will always be imported. In some cases, a parameter may be imported but changed to comply with a style or rule of the destination diagram.

The parameters that may be imported or changed may encompass any variable or value that may be assigned to an item in a diagram. Each embodiment or implementation may have different parameters with different settings, depending on the design of the system, conventions, compatibility with other systems, or any other reason.

The diagram 802 is an example of a purely sequential diagram that allows a hierarchical data structure. The items in pictorial view 806 are defined as three items, corresponding to the highest level items in the data view 804. The items happen to be arranged in a sequential manner, with arrows from one item to another. The first item 840 includes hierarchical data in the form of a parent "A" with children "B" and "C". This hierarchical information is displayed as a top level "A" with indented children "B" and "C" in the pictorial view 806. In the diagram 802, the hierarchical information is allowed and treated in a specific way, even though the pictorial view 806 is a purely sequential or peer-type graphical representation.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A computer readable storage medium comprising computer executable instructions configured to perform a method comprising:
   receiving a first graphical diagram comprising a set of relationship rules that describe an acceptable relationship type and a first relationship of said acceptable relationship type defined between a first object and a second object;
   receiving user input comprising a command to copy a third object and a selection for said first object;
   pasting said third object into said first graphical diagram to create a fourth object responsive to receiving said command and said selection, wherein said pasting comprises, with no further user input:
  dissolving said first relationship between said first object and said second object;
  referencing said set of relationship rules to establish a second relationship of said acceptable relationship type between said first object and said fourth object;
  referencing said set of relationship rules to establish a third relationship of said acceptable relationship type between said fourth object and said second object; and
  inserting a text item corresponding to the third object into a data view that includes text items corresponding to said first object and said second object, wherein said inserting said text item comprises displaying said inserted text item, said text item corresponding to said first object and said text item corresponding to said second object in said data view in a manner that visually indicates in said data view said establishment of said second relationship of said acceptable relationship type between said first object and said fourth object and said establishment of said third relationship of said acceptable relationship type between said fourth object and said second object.

2. The computer readable storage medium of claim 1 wherein said first object comprises a first shape definition, wherein said third object comprises a second shape definition, and wherein said pasting further comprises applying said first shape definition to said fourth object.

3. The computer readable storage medium of claim 2 wherein said third object comprises customization settings, said customization settings being applied to said fourth object.

4. The computer readable storage medium of claim 1, said third object comprising text.

5. A computer readable storage medium comprising computer executable instructions configured to perform a method comprising:
  receiving a first graphical diagram comprising a set of relationship rules that describe an acceptable relationship type, a first relationship of said acceptable relationship type defined between a first object and a second object and a second relationship of said acceptable relationship type defined between said second object and a third object;
  receiving user input comprising a selection for said second object;
  removing said second object from said first graphical diagram responsive to said selection, wherein said removing includes, with no further user input:
    dissolving said first relationship between said first object and said second object;
    dissolving said second relationship between said second object and said third object;
    referencing said set of relationship rules to establish a third relationship of said acceptable relationship type between said first object and said third object; and
    removing a text item corresponding to said second object from a data view that displays text items corresponding to said first object, said second object and said third object, wherein said removing said text item comprises displaying said text item corresponding to said first object and said text item corresponding to said third object in said data view in a manner that visually indicates in said data view said establishment of said third relationship of said acceptable relationship type between said first object and said third object.

6. The computer readable storage medium of claim 5, wherein said acceptable relationship type comprises a hierarchical relationship.

7. The computer readable storage medium of claim 5, wherein said acceptable relationship type comprises a sequential relationship.

8. The computer readable storage medium of claim 5, wherein said removing further includes:
  referencing said set of relationship rules to determine a position of said first object and said third object.

9. A computer readable storage medium comprising computer executable instructions configured to perform a method comprising:
  receiving a first graphical diagram definition comprising a first set of relationship rules that describe a first acceptable relationship type and a first default spatial configuration;
  receiving a first data model comprising nodes of data;
  creating a first graphical representation by a first method comprising:
    for each node of data in said first data model, defining a corresponding graphical object in said first graphical representation;
    arranging said graphical objects in said first graphical representation based on said first default spatial orientation; and
    establishing relationships of said first acceptable relationship type between said graphical objects in said first graphical representation;
  receiving a second graphical diagram definition comprising a second set of relationship rules that describe a second acceptable relationship type and a second default spatial configuration;
  receiving a second data model comprising nodes of data;
  creating a second graphical representation by a second method comprising:
    for each node of data in said second data model, defining a corresponding graphical object in said second graphical representation;
    arranging said graphical objects in said second graphical representation based on said second default spatial configuration; and
    establishing relationships of said second acceptable relationship type between said graphical objects in said second graphical representation;
  selecting a first object from said first graphical representation;
  copying said first object into a buffer;
  pasting said first object into said second graphical representation from said buffer by a third method of:
    selecting a second object within said second graphical representation based on user input; and
    responsive to the selecting of the second object performing with no further user input:
      referencing said second set of relationship rules to establish a relationship of said second acceptable relationship type between said first object and said second object;
      adding said first object to said second graphical representation; and
      arranging said graphical objects in said second graphical representation based on said second default spatial configuration; and copying a text item corresponding to said first object from a first data view that includes text items corresponding to objects in said first graphical representation to a second data view that includes text items corresponding to objects in said second graphical representation, wherein said copying comprises displaying said copy of said text item corresponding to said first object and said text item corresponding to said second object in said second data view in a manner that visually indicates in said second data view said establishment of said relationship of said second acceptable relationship type between said first object and said second object.

10. The medium of claim 9, wherein said second acceptable relationship type is hierarchical.

11. The medium of claim 9, wherein said second acceptable relationship type is sequential.

12. The medium of claim 9, wherein said second acceptable relationship type is a peer to peer relationship.

13. The medium of claim 9, said first object having a customization defined within said first graphical representation, and applying said customization to said first object in said second graphical representation.

14. The medium of claim 9, said third method further comprising:
removing said first object from said first data model; and
removing said first object from said first graphical representation.

15. The medium of claim 9, wherein said first acceptable relationship type is sequential and said second acceptable relationship type is hierarchical.

16. The medium of claim 9, wherein said first acceptable relationship type is hierarchical and said first acceptable relationship type is sequential.

* * * * *